3,679,532
FLEXIBLE INSULATING SHEET CONTAINING BORON NITRIDE FIBERS AND METHOD FOR FORMING THE SAME
William S. Neff, Lima, Ohio, assignor to Westinghouse Electric Corporation, Pittsburgh, Pa.
No Drawing. Filed Dec. 8, 1969, Ser. No. 883,280
Int. Cl. B32b 5/12
U.S. Cl. 161—59                  12 Claims

ABSTRACT OF THE DISCLOSURE

A strong, flexible sheet insulation is prepared by firing boron nitride fibers combined with submicroscopic fibrous crystals of boehmite alumina. Boron nitride fibers, having a diameter from about 10 to 30 microns and a length of about 1 to 4 inches, are laid out in layers and the boehmite alumina is distributed throughout the layers. The combination is fired in air at a temperature in the range of about 750 to 1000° F.

BACKGROUND OF THE INVENTION

This invention relates, generally, to flexible inorganic electrical insulation and, more particularly to a flexible insulating sheet of boron nitride fibers and an inorganic binder and to methods of making such insulating sheets.

Electrical insulating materials intended for stable, long-term operation at high temperatures in outer space have been hard and/or inflexible except when used in the form of fibers. Cloth and mica composites based on glass fibers have been used with selected additives such as resins or inorganic refractories to facilitate fabrication or installation of the composite in the electrical apparatus produced. These additives are potential sources of undesirable contamination by outgassing. Outgassing is more likely at high temperatures (e.g. above 1000° F.) in the vacuum of space than in the more typical environmental conditions in which conventional electrical apparatus must operate. If these additives are driven off in the processing to minimize outgassing, physical properties such as flexibility and strength, indeed physical integrity if the additive is a binder, may be adversely affected. Sheet products in the form of glass, quartz, zirconium oxide, or aluminum silicate fiber paper, as well as heretofore produced boron nitride sheets, have typically been mechanically weak and difficult to incorporate into electrical apparatus as insulation.

The known properties of boron nitride, properties such as exceptionally high heat resistance (1800° F. in oxidizing 5000° F. in reducing atmospheres), dielectric strength (950 v./mil), high surface and volume resistivity and low dissipation factor over a wide temperature range, make it a potentially attractive high temperature electrical insulation. Hot pressed bodies containing boron nitride have been disclosed in the prior art. U.S. Pat. 3,240,614 and U.S. Pat. 3,341,918 disclose methods of making such bodies. It should be apparent that such bodies would have limited applications as electrical insulation and could not be used for example, as layer insulation in electrical coils. Layers of pyrolitic boron nitride deposited from gases by thermal decomposition to function as dielectric layers in capacitors are described in U.S. Pat. 3,335,345.

U.S. Pat. 2,915,475 describes the preparation of fibrous alumina monohydrate having the boehmite crystals lattice. That fibrous alumina product is in the form of fibrils which have one or more dimensions in the colloidal range and may be in colloidal sols in water or organic media. U.S. Pat. 2,917,426 and U.S. Pat. 3,031,322 describe fibrous boehmite in combination with a large variety of organic and inorganic materials, some of which may be in the form of fibers. The latter patent describes a combination of fibrous boehmite as a bonding agent for boron nitride insulation in the form of slip castings.

SUMMARY OF THE INVENTION

It is an object of this invention to provide a flexible inorganic sheet electrical insulation that may be used at high temperatures in vacuum environments.

Another object is to provide methods for producing such electrical insulation.

Plural layers of long boron nitride fibers having colloidal boehmite alumina distributed through the layers is fired at about 750–1000° F. in air until a white colored product is obtained. The product is a flexible sheet with excellent electrical, mechanical and physical properties and stability at high temperatures and compatible with other components of an electrical system, including the electrical conductors, magnetic alloys, structural materials and other electrical insulation. The stability and compatibility of the product at high temperatures in vacuum environments suggest its utility for insulating electrical equipment in space mission. The flexible sheet product may, for example, be used as ground or layer insulations, phase separators and slot liners in rotating electrical machinery.

DESCRIPTION OF THE PREFERRED EMBODIMENTS

Boron nitride fibers are too slippery to make a yarn or a paper if the fibers are relatively short in length, e.g. one-quarter inch and less. Boron nitride fibers having a length of about one-quarter inch did not, for example, produce a satisfactory product in the methods hereinafter disclosed. Boron nitride fibers having lengths from about one to four inches were suitable and did produce desirable products. The fibers may vary in diameter. Although those actually used were about 10 microns in diameter, fibers having diameters up to about 30 microns may be used. Long boron nitride fibers (99+% boron nitride) are available commercially from the Carborundum Corporation. The fibers are laid out into a sheet preferably in layers with the fibers having an equally spaced triaxial orientation as opposed to a random or perpendicular orientation. The triaxial orientation may be easily accomplished in the total sheet by laying the fibers parallel in a given layer and orienting the axes of the fibers in three adjacent layers with an equal angular spacing (120°) from one layer to the next. Such an orientation will provide good physical properties in all directions. Sheets up to a thickness of about 30 mils may be made flexible in accordance with this invention.

After the desired boron nitride sheet thickness has been achieved, colloidal fibrous boehmite alumina is distributed throughout the sheet. Fibrous boehmite alumina is available commercially as a white powder under the proprietary name "Baymal" (Du Pont Company). The major components on a weight basis are: (1) about 84% AlOOH (as the submicroscopic fibrous crystals or "fibrils" of boehmite alumina), (2) about 2% CH₃COOH (as absorbed surface groups) and (3) about 2% water (as absorbed surface moisture). The powder disperses readily in water to form slightly acidic, stable, colloidal sols. Organic liquids, e.g. alcohols such as methanol and ethanol, may be used as the liquid carrier in place of the water. The properties and preparation of fibrous boehmite alumina and colloidal sols thereof are described in U.S. Pat. 2,915,475.

The fibrous boehmite alumina may be conveniently incorporated into boron nitride sheet in a colloidal sol that will wet the boron nitride fibers. An alcohol carrier will form such a sol although such sols do not appear to be as stable as those employing water as the carrier. There is, therefore, some advantage to depositing an aqueous sol on the boron nitride sheet and then adding a mixture of equal parts of water and, for example, methanol. The initial deposit will not wet the fibers but there is a penetration of the paper and wetting of fibers upon the addition of the mixture of water and alcohol.

It should, of course, be understood that other methods of distributing the fibrous boehmite alumina in the boron nitride paper may be employed so long as there is a uniform and thorough distribution. Indeed, other methods wherein the fibrous boehmite alumina and the boron nitride fibers are simultaneously formed into a substantially homogeneous sheet would be satisfactory so long as the essential conditions of this invention prevail. Another such essential condition, in addition to the boron nitride fiber length, is the relative proportion of boron nitride fibers and fibrous boehmite alumina. For each 100 parts of weight of boron nitride fibers, from about 70 to 90 parts of fibrous boehmite alumina must be present. Less than about 70 parts of the alumina will result in a weak, poorly bonded product. More than 90 parts will produce a rigid product, lacking the desired flexibility for sheet insulation.

The sheet containing the combination of boron nitride fibers and fibrous boehmite alumina must be fired in an oxidizing atmosphere, e.g. air, at a temperature between about 750° F. and about 1000° F. for about one-half to two hours or until the resulting paper produced is white in color, a change from the off white or ivory color of the unfired sheet. Firing at 1250° F. for 20 minutes, for example, produces a weakly bonded product. Firing in a vacuum or in a reducing atmosphere is not satisfactory.

A flexible sheet electrical insulation has been prepared from 1.2 grams of boron nitride fibers having a diameter of about 10 microns and lengths from about 1 to 4 inches. Three layers of the fibers were laid out in a five and one-half inch diameter Petri dish, the fibers in each layer being parallel and the heretofore described triaxial orientation between layers. Twenty milliliters of a colloidal water sol containing 5 percent by weight of fibrous boehmite alumina was poured onto the boron nitride fibers, the pH of the sol being adjusted to make it slightly alkaline. One hundred milliliters of a mixture of equal parts of methanol and distilled water was added to the dish, whereupon the boron nitride fibers were wetted. The wet sheet was compressed to eliminate as much of the alcohol and water as was convenient. The drained sheet was dried between sheets of a non-adhering plastic film, e.g. polyethylene, or polytetrafluoroethylene, at a temperature between 150 to 200° F. When the sheet was dry, the plastic film was removed and the sheet was fired in air for about one-half hour at 850° F., at the end of which time the paper was white in color.

Test results have shown the electric strength of a 12 mils thick product made as described above to be 150 to 200 volts AC per mil at 77° F. Electric strength at 800° F. in air for samples 11 to 15 mils thick was 70 to 100 v.p.m. Current leakage on 10–12 mil samples became excessive at 80 v.p.m., when measured between 2 inch diameter ASTM electrodes in 25 volt steps at room temperature in air. Synthetic mica paper subjected to the same test showed an excessive leakage at 30 to 40 v.p.m. Insulation resistance of a 16 mil thick sample of the sheet insulation of this invention at 100 volts AC is compared with a typical mica-based paper in the following Table I:

TABLE I
[Volume resistivity (ohm-cm.)]

| Temperature, ° F. | Boron nitride paper | Mica paper |
|---|---|---|
| 565 | 5.6×10¹⁴ | 1×10¹¹ |
| 905 | 1×10¹² | 1×10⁹ |
| 1,027 | 3×10¹⁰ | 3×10⁸ |

The flexible insulating sheet of this invention may be wound and/or otherwise assembled into electrical apparatus with the typical techniques used in winding and/or assembling glass fiber reinforced organic sheet material into electrical apparatus. The vacuum stability and cleanliness of the sheet permits rapid pump-down of vacuum test chambers and, therefore, of electrical apparatus.

The stability of the product and the absence of outgassing explain the absence of contamination during long term aging in vacuum test chambers and assure the absence of contamination during long term use in evacuated electrical apparatus. Tests conducted on the insulating sheets of this invention indicate that it may be used for prolonged period of continuous operation at temperatures up to 1000° F. in air and up to 1400° F. (to 1800° F. by extrapolating measured data) in vacuum (18⁻⁸ Torr) or inert gas (nitrogen, helium, neon, krypton, argon, etc.) environments.

I claim as my invention:

1. A flexible insulating sheet comprising the combination of plural layers of boron nitride fibers at least about one inch in length and fibrous boehmite alumina distributed about the boron nitride fibers, the combination having been fired at a temperature above about 750° F.

2. The insulating sheet of claim 1 wherein the combination is fired in an oxidizing atmosphere at a temperature in the range of about 750 to 1000° F.

3. The insulating sheet of claim 2 wherein the boron nitride fibers within a layer are substantially parallel.

4. The insulating sheet of claim 3 wherein the sheet comprises at least three layers and the boron nitride fiber axis of one layer is angularly displaced about 120 degrees from that of the two next adjacent layers.

5. The insulating sheet of claim 4 wherein the boron nitride fibers have a length of from about 1 to 4 inches.

6. The insulating sheet of claim 5 wherein the boron nitride fibers have a diameter in the range of about 10 to 30 microns.

7. The insulating sheet of claim 6 wherein from about 70 to 90 parts of fibrous boehmite alumina are present for each 100 parts by weight of boron nitride fibers.

8. A method of making flexible inorganic electrical sheet insulation comprising the steps of:
(1) providing plural layers of boron nitride fibers having fibrous boehmite alumina distributed throughout said layers and about said boron nitride fibers and
(2) heating the layers at a temperature in the range of about 750 to 1000° F. in an oxidizing atmosphere.

9. The method of claim 8 wherein the proportion of alumina to boron nitride is in the range of about 70 to 90 parts by weight of alumina for each 100 parts of boron nitride.

10. The method of claim 9 wherein the fibrous boehmite alumina is distributed in the layers in the form of a colloidal sol, the alumina being suspended in a liquid carrier.

11. The method of claim 10 wherein the liquid carrier is removed prior to firing.

12. The method of claim 10 wherein the colloidal sol contains an alcohol.

References Cited

UNITED STATES PATENTS

| | | | |
|---|---|---|---|
| 3,462,340 | 8/1969 | Hough | 161—59 |
| 3,476,641 | 11/1969 | Milewski | 161—170 |

WILLIAM A. POWELL, Primary Examiner

U.S. Cl. X.R.

117—16, 140; 156—89; 161—156, 170